United States Patent [19]

Haas

[11] Patent Number: 4,728,118
[45] Date of Patent: Mar. 1, 1988

[54] COLLAPSIBLE CARRIER STAND FOR HEAVY MACHINE

[75] Inventor: John L. Haas, Rowland Heights, Calif.

[73] Assignee: Roco Tool Group, Inc., Monterey Park, Calif.

[21] Appl. No.: 853,904

[22] Filed: Apr. 21, 1986

Related U.S. Application Data

[63] Continuation-in-part of Ser. No. 700,490, Feb. 11, 1985, Pat. No. 4,611,823.

[51] Int. Cl.⁴ ................................................. B62B 3/02
[52] U.S. Cl. .................................... 280/641; 108/119; 248/439; 280/651
[58] Field of Search ............... 280/641, 645, 651, 652, 280/659, DIG. 6; 108/118, 119, 120; 248/164, 166, 432, 439; 297/56

[56] References Cited

U.S. PATENT DOCUMENTS

| | | | |
|---|---|---|---|
| 2,492,676 | 12/1949 | Zajicek | 280/641 |
| 2,531,856 | 11/1950 | Marcouiller | 280/641 |
| 2,890,061 | 6/1959 | Watson | 280/DIG. 6 |
| 2,917,339 | 12/1959 | Gottfried et al. | 280/47.38 |
| 3,274,627 | 9/1966 | Behnke | 10/96 R |
| 3,782,749 | 1/1974 | Wiczer | 280/641 |
| 3,797,695 | 3/1974 | Law | 248/164 |
| 4,199,170 | 4/1980 | Hubner et al. | 280/641 |

FOREIGN PATENT DOCUMENTS

553885  1/1957  Italy ..................................... 108/120

Primary Examiner—John J. Love
Assistant Examiner—Eric D. Culbreth
Attorney, Agent, or Firm—William W. Haefliger

[57] ABSTRACT

A collapsible carrier for a heavy machine, has
(a) an upper platform adapted to support the machine,
(b) first leg structure pivotally attached to the platform and extending downwardly and forwardly relative to the platform,
(c) second leg structure having upper extent located to support the platform and extending downwardly and rearwardly relative to the platform,
(d) the first and second leg structures pivotally interconnected below the level of the platform,
(e) there being a slide surface associated with the platform and presented to transmit loading to the second leg structure upper extent as that upper extent travels therealong between first and second positions corresponding to raised and lowered positions of the platform and there being stops associated with the platform to limit such travel at the first and second positions,
(f) releasable mechanism to lock the second leg structure upper extent to the platform at the first and second positions,
(g) and a counterbalance operatively connected with said first and second leg structures to yieldably resist downward movement of the platform, thereby counterbalancing the weight of the machine,
(h) the releasable mechanism including at least one arm integral with the second leg structure upper extent and projecting upwardly adjacent at least one of the stops in the first position of the second leg structure upper extent, and at least one plunger carried by the arm to releasably attach to structure associated with the platform, and block movement of that platform relative to the second leg structure.

10 Claims, 19 Drawing Figures

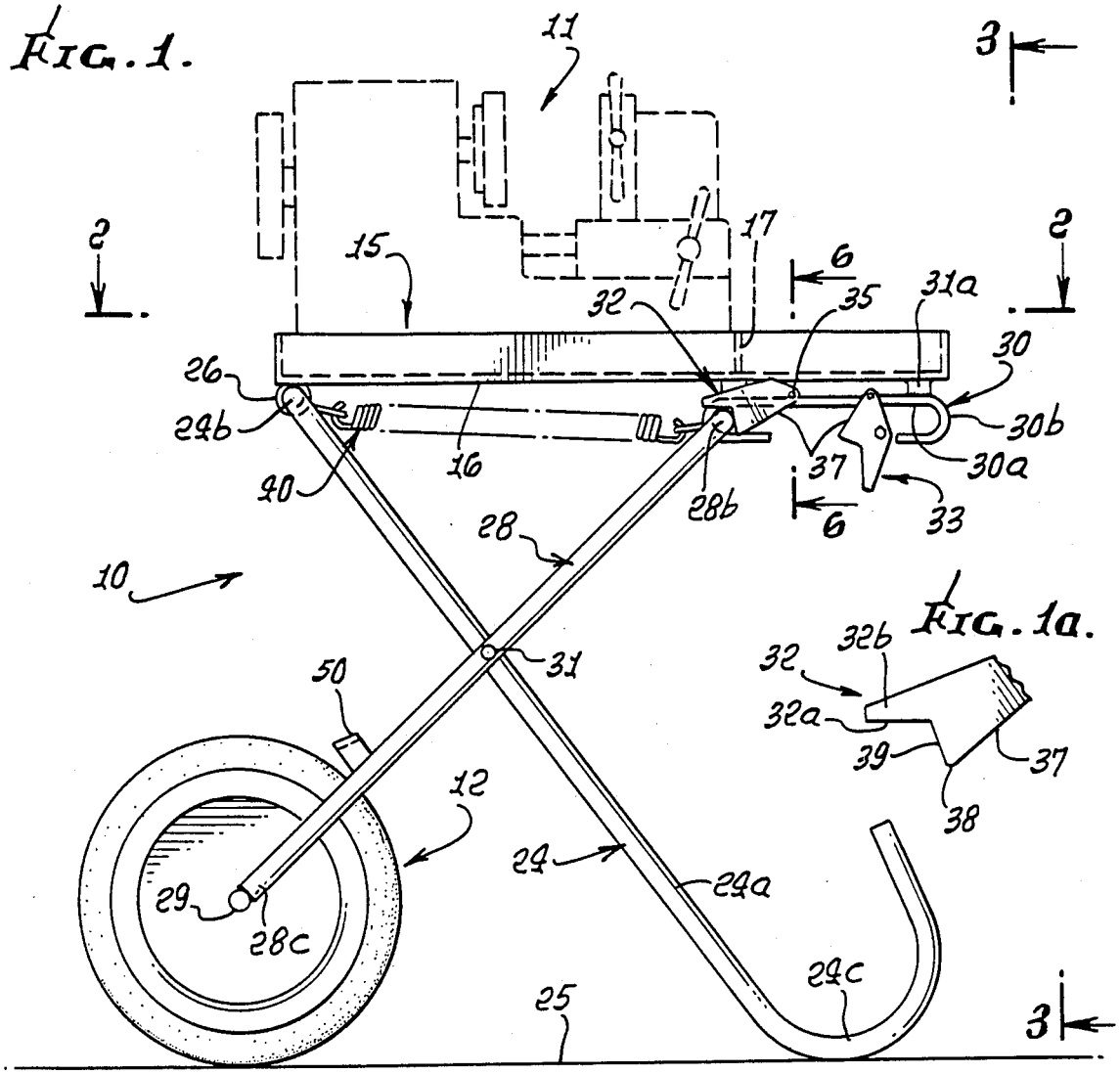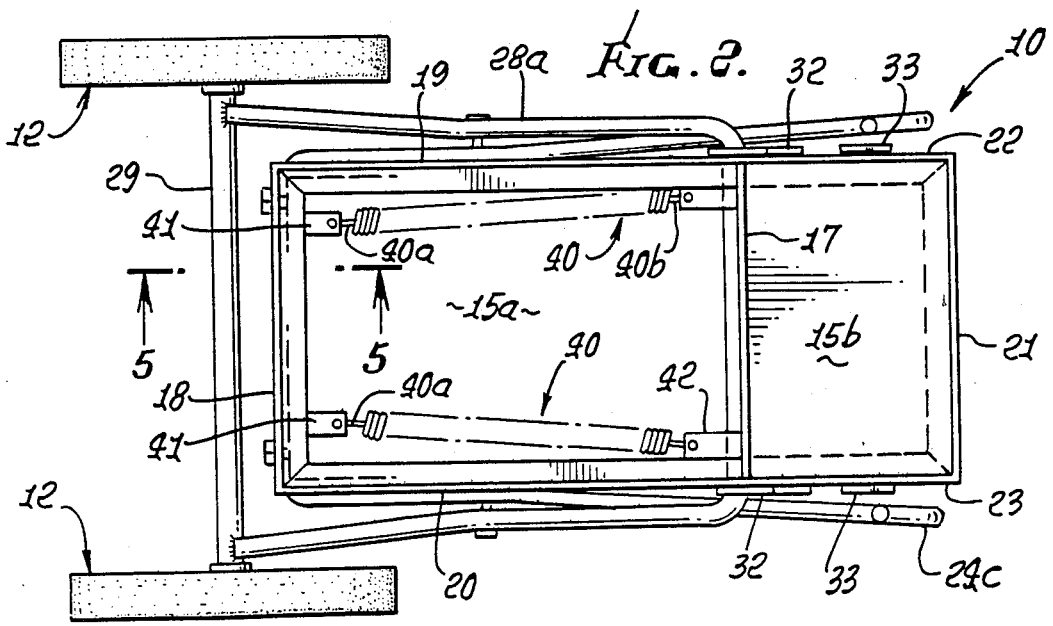

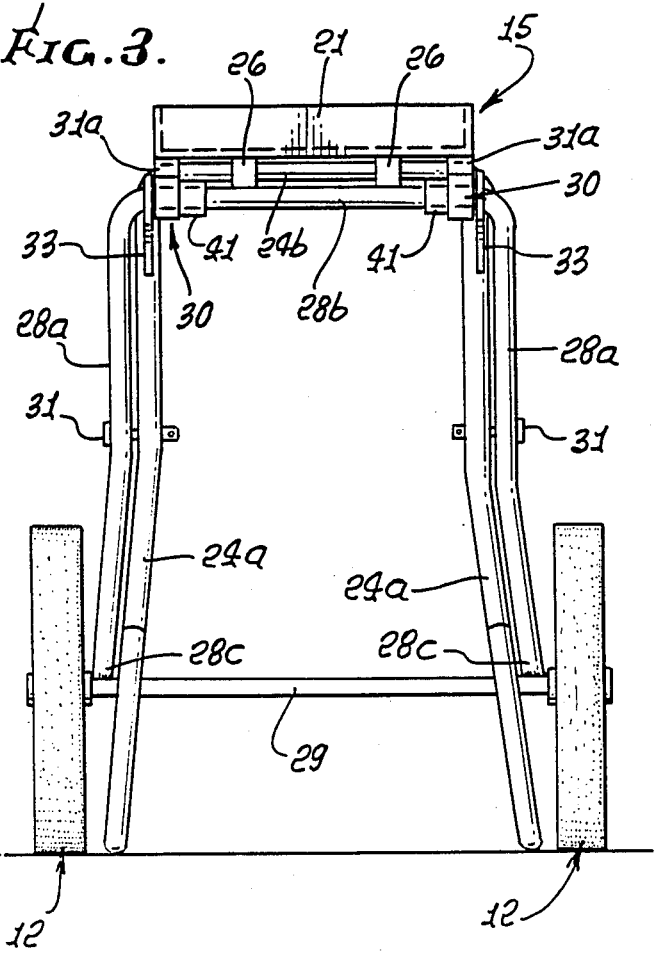
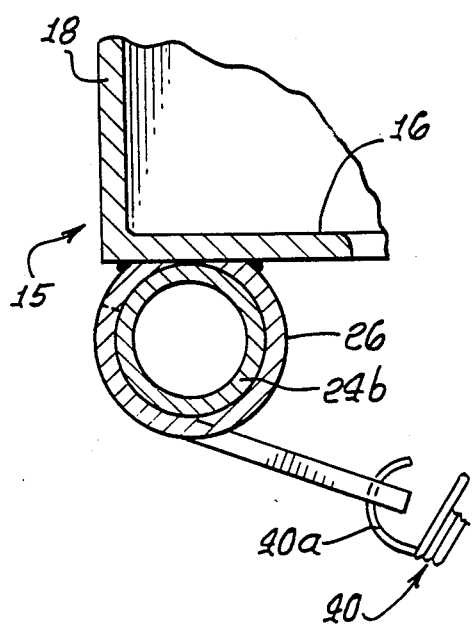
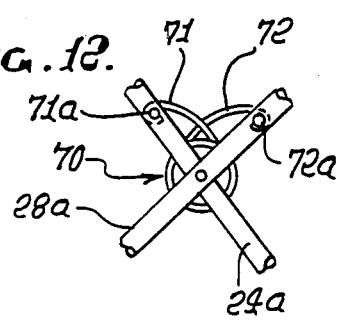
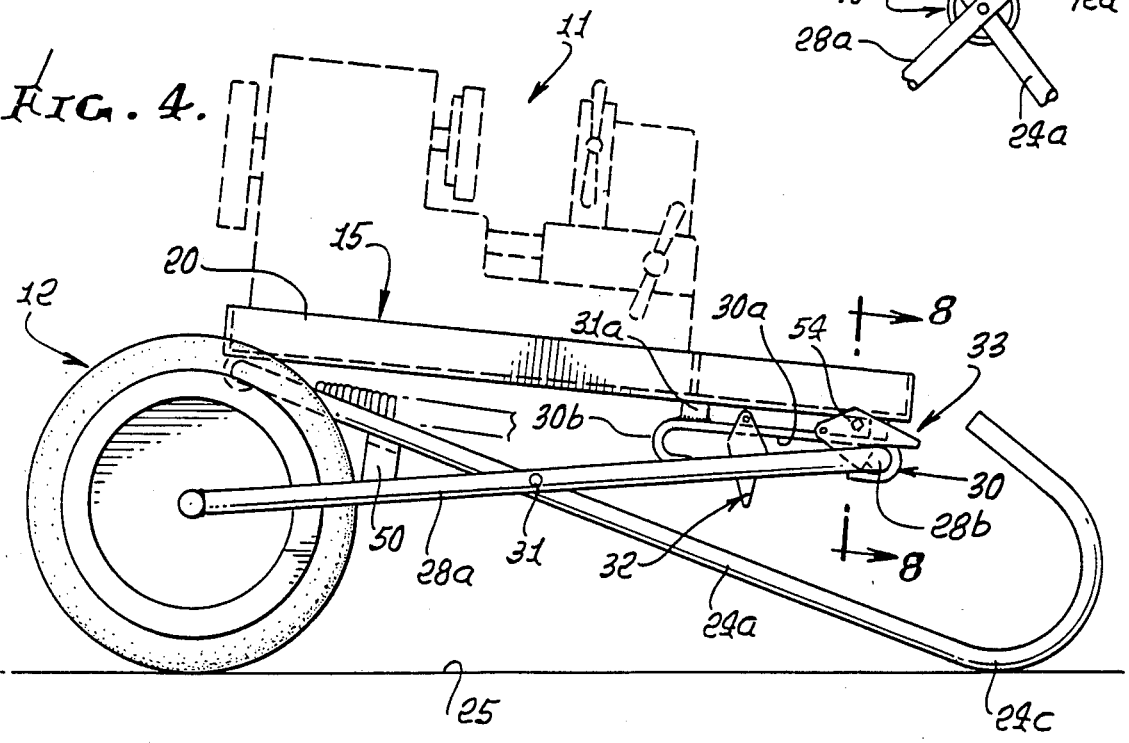

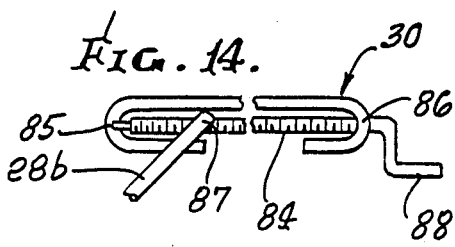
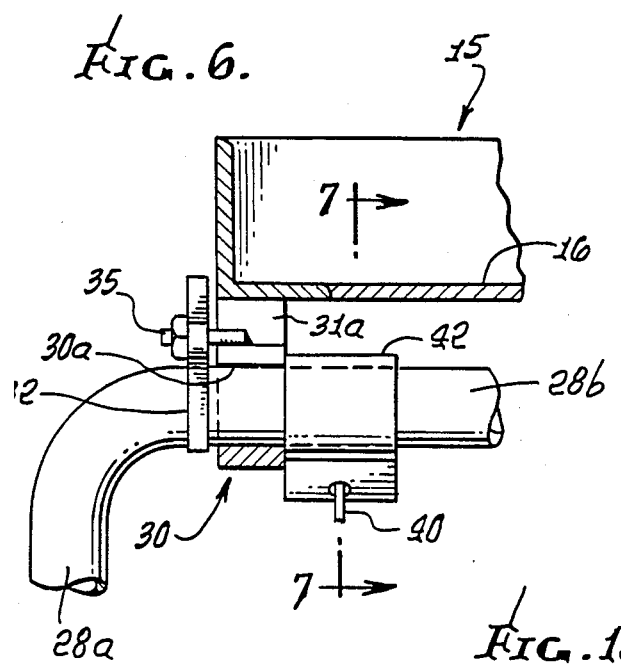
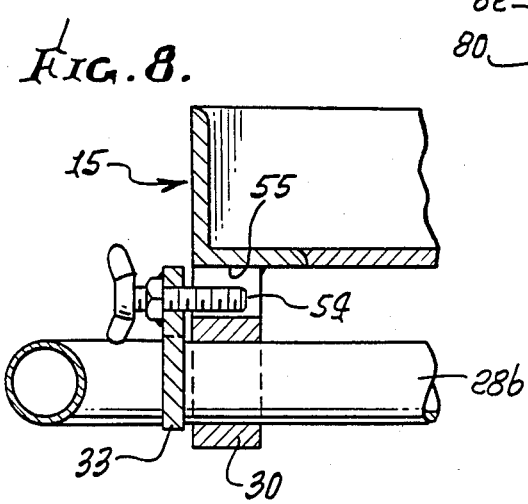
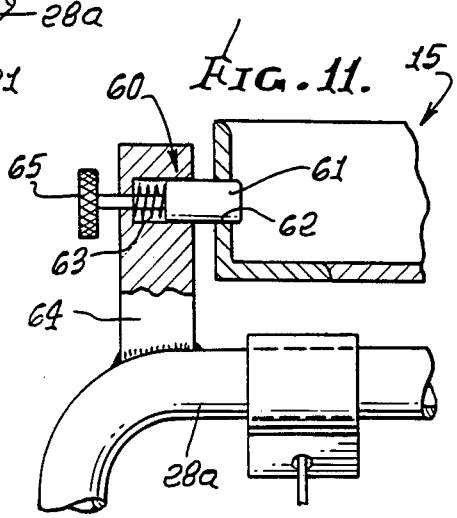
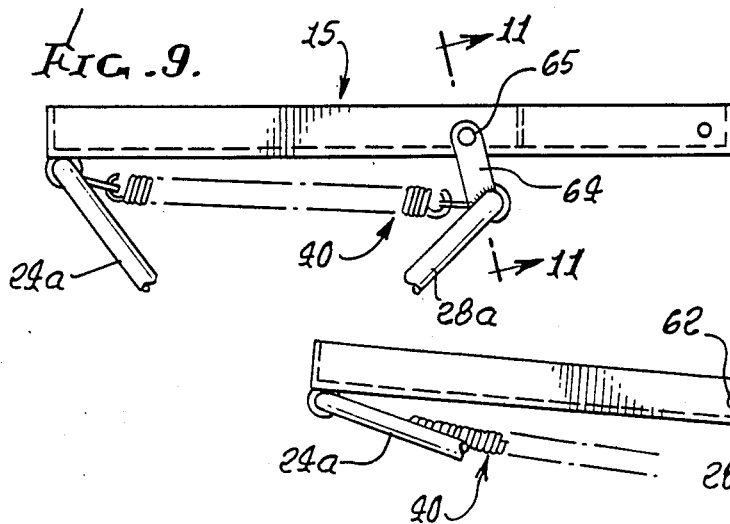
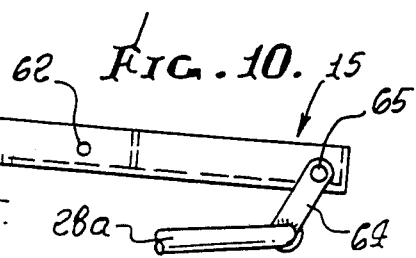

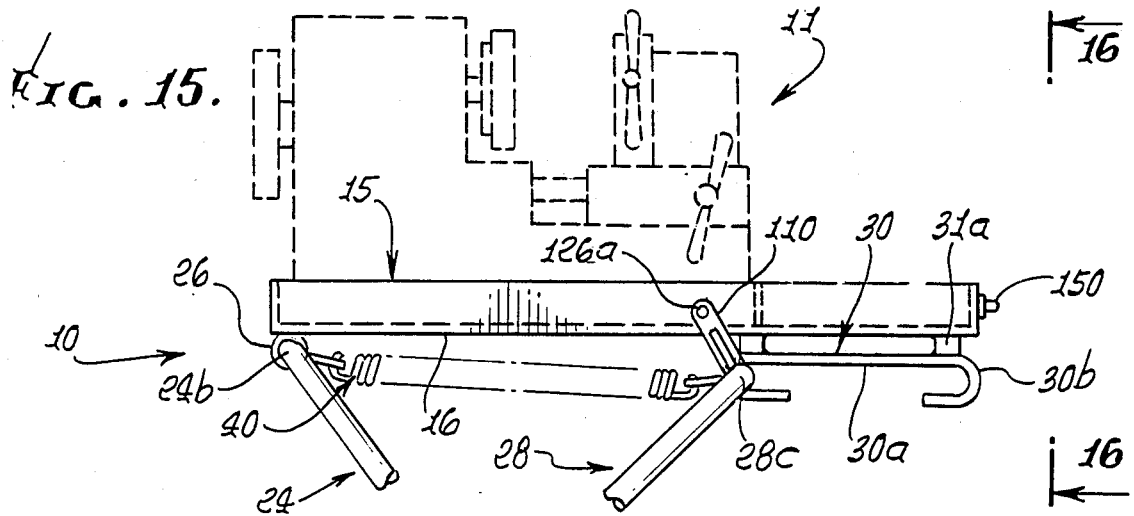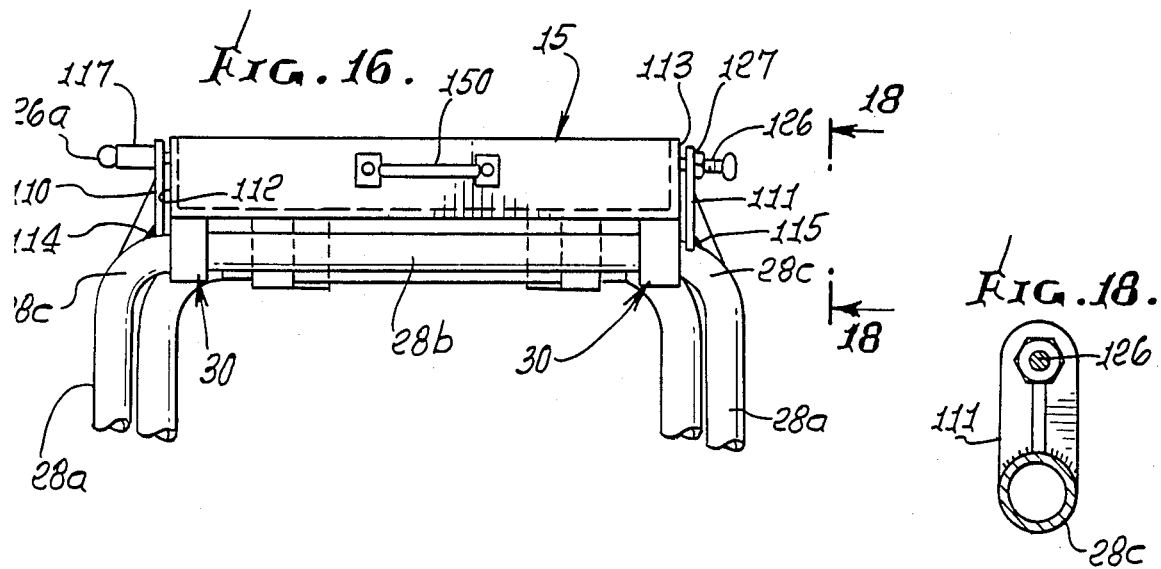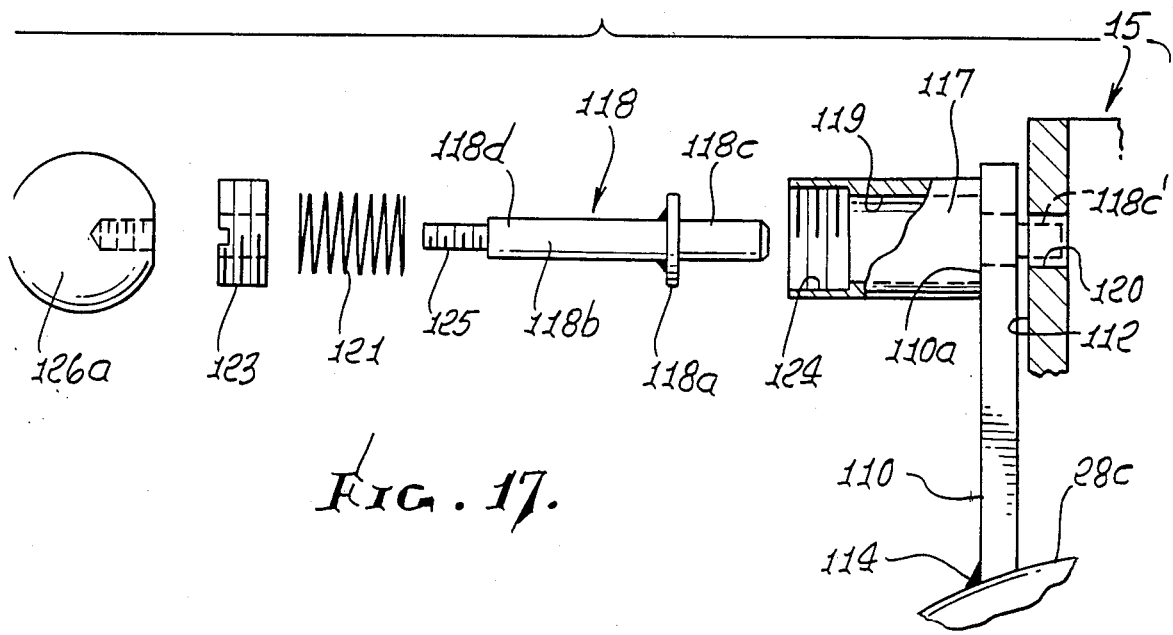

COLLAPSIBLE CARRIER STAND FOR HEAVY MACHINE

This application is a continuation-in-part of Ser. No. 700,490, now U.S. Pat. No. 4,611,823 filed Feb. 11, 1985.

BACKGROUND OF THE INVENTION

This invention relates generally to portable machinery, and more particularly to carrier apparatus for transporting a pipe threader between desired locations, and enabling raising and lowering of the threader.

There is need for portable carrier apparatus for heavy machinery such as pipe threaders and the like; and there is also need for raising and lowering the pipe threader, as between desired operating and stored positions. The extreme weight of such steel machinery, however, has previously prevented ease of portability combined with elevation control, or made same excessively complicated. See for example U.S. Pat. No. 3,274,627 disclosing a heavy pipe threader, which is not easily controlled in the desired manner.

SUMMARY OF THE INVENTION

It is a major object of the invention to provide carrier apparatus which meets the above need, and provides a number of unusual advantages both structurally and operatively, ease of level control being one of same, and simplicity being another.

Basically, the carrier comprises
(a) an upper platform adapted to support the machine,
(b) first leg means pivotally attached to the platform and extending downwardly and forwardly relative to the platform,
(c) second leg means having upper extent located to support the platform and extending downwardly and rearwardly relative to the platform,
(d) the first and second leg means pivotally interconnected below the level of the platform,
(e) there being a slide surface associated with the platform presented to transmit loading to the second leg means upper extent as the upper extent travels therealong between first and second positions corresponding to raised and lowered positions of the platform, and there being stops associated with the platform to limit such travel at said first and second positions,
(f) releasable means to lock said upper extent to the platform at the first and second positions,
(g) counterbalance means operatively connected with the first and second leg means to yieldably resist downward movement of the platform, thereby counterbalancing the weight of the machine,
(h) and laterally spaced guides associated with the platform and said second leg means upper extent to limit relative motion therebetween, laterally, during said travel.

Further, and as will be seen, the slide surface is advantageously defined by a guide plate the opposite ends of which extend downwardly and reversely to define the stops; the guides include arms projecting upwardly at the sides of the guide plate that defines said slide surface, said plate having reversely turned ends that define said stops and limit longitudinal travel of the second leg means upper extents, and the first leg means has upper end extent pivotally attached to the platform, and also to which counterbalance spring means is attached, below the level of the platform.

Additionally, the releasable lock means may advantageously comprise at least one arm integral with the second leg means upper extent and projecting upwardly adjacent at least one of said stops in said first position of the second leg means upper extent, and at least one plunger carried by said arm to releasably attach to structure associated with the upper platform and block movement of the platform relative to said second leg means. In this regard, the releasable lock means may also include a tubular part carried by said arm, the plunger supported for movement within the tubular part for lateral travel toward and away from the platform, and means by which the plunger may be retained in interlocking relation with the platform.

These and other objects and advantages of the invention, as well as the details of an illustrative embodiment, will be more fully understood from the following specification and drawings, in which:

DRAWING DESCRIPTION

FIG. 1 is a side elevation showing the carrier apparatus in raised position; and FIG. 1a is an enlargement of a latch cam;

FIG. 2 is a top plan view on lines 2—2 of FIG. 1;

FIG. 3 is an end view on lines 3—3 of FIG. 1;

FIG. 4 is a side elevation showing the carrier apparatus in lowered or collapsed position;

FIG. 5 is an enlarged fragmentary section taken on lines 5—5 of FIG. 2;

FIG. 6 is an enlarged fragmentary section taken on lines 6—6 of FIG. 1;

FIG. 7 is a fragmentary section taken on lines 7—7 of FIG. 6;

FIG. 8 is an enlarged fragmentary section on lines 8—8 of FIG. 4;

FIGS. 9 and 10 are fragmentary side elevations showing alternate leg means positions associated with an alternate locking means;

FIG. 11 is an enlarged section on lines 11—11 of FIG. 9, showing the alternate locking means;

FIG. 12 shows an alternate spring structure;

FIG. 13 shows an alternate removable axle connection;

FIG. 14 shows an alternate hand-crank adjustment;

FIG. 15 is a view like FIG. 1, showing a modification;

FIG. 16 is an end view on lines 16—16 of FIG. 15;

FIG. 17 is an enlarged exploded view showing details of a releasable lock; and

FIG. 18 is an enlarged view on lines 18—18 of FIG. 16.

DETAILED DESCRIPTION

As shown in the drawings, a collapsible carrier 10 is provided for a heavy machine 11, as for example a portable pipe threader. The carrier has a raised position (see FIG. 1) in which the machine 11 may be transported about, as by virtue of wheels 12 associated with the carriage 10; and a lowered position (see FIG. 4) in which the machine may be used, as for example in pipe threading.

The carrier 10 includes an upper platform 15 which is horizontal in FIG. 1, and is tilted from horizontal in FIG. 4. The platform is adapted to carry the heavy machine 11, and may include a first tray 15a in which the machine is seated, and a second tray 15b, as for example a tool tray. The two trays have a common bottom wall 16 and a common divider flange 17; and there are upstanding flanges or walls 18–23 associated with the trays, as shown.

First leg means 24 is pivotally attached to the platform to extend downwardly and forwardly relative to the platform. See for example the two tubular metallic legs 24a interconnected by a tubular cross-piece 24b, and extending in laterally spaced, parallel relation to terminate at upturned terminals or feet 24c engaging the floor 25. Cross-piece 24b extends laterally immediately beneath the left end of the platform in FIG. 1, to partially support the platform and its machine load. Pivot brackets 26 form bearings for the cross-piece, and are welded to the bottom wall 16 of the tray.

Second leg means 28 is also provided to have upper extent located to support the platform, and to extend downwardly and rearwardly relative to the platform. See for example the two tubular metallic legs 28a interconnected by tubular cross-piece 28b, and extending downwardly in laterally spaced, parallel relation, to lower end terminals 28c. The latter support a laterally horizontally extending axle 29 for the wheels 12. Cross-piece 28b is shown extending laterally immediately beneath a slide surface or surfaces 30a associated with the platform, to partially support the platform and its machine load. The two pairs 24a and 28a of legs are pivotally interconnected as by pins 31, to provide scissors connections, allowing movement of the legs and platform between FIG. 1 and FIG. 4 positions.

In accordance with an important aspect of the invention, there are two slide surfaces 30a defined by two laterally spaced, like guide plates 30, attached as by spacers 31a to the underside of the platform, at the right end thereof, in FIG. 1. Slide surfaces 30a are presented downwardly to transmit loading to the second legs via cross-piece 28b (the upper extent of the legs) as the cross-piece 28b travels rightwardly and leftwardly between first and second positions corresponding respectively to raised and lowered (FIGS. 1 and 4) positions of the platform. Stops are associated with the platform to limit such travel at the raised and lowered positions; for example, the guide plates have downwardly and reversely turned ends 30b to define such stops configured to capture the cross-piece as shown, and cooperating with releasable means, such as latches 32 and 33 to lock the cross-piece at such first and second positions. The two latches 32 automatically capture and latch the cross-piece 28b as it travels leftwardly toward and into FIG. 1 position; and the two latches 33 automatically capture and latch the cross-piece 28b as it travels rightwardly toward and into FIG. 4 position, whereby retention of the heavy machine in either raised or lowered position is assured. The reversely turned terminal portions 30b of the guide plates extend in spaced relation from the legs 28a, as do the cams, 32 and 33, to prevent leg binding; however, portions 30b also act to provide means associated with the platform and legs to guide leg cross-piece travel, longitudinally.

The latch cams 32 are shown as pivotally attached at 35 to guide plate structure 30, and tend to gravitationally swing downwardly into positons at the sides of the guide plates to be swingably cammed upwardly by the cross-piece 28b. To this end they have angled cam surfaces 37, and as cross-piece 28b moves leftwardly, it engages cam surfaces of cams 32 to pivot them clockwise in FIG. 1, until the cross-piece passes over intersections 38 of cams then again gravitationally drop pivot until retention surfaces 39 block escape of the crosspiece from captured position. Cam stop shoulders 32a engage the top of the cross-piece at this time. Shoulders 32a are on a jutting finger piece 32b, which is easily graspable by the operator to lift the cams 32 at such time as rightward travel of the cross-piece 28a toward FIG. 4 position is desired. Cams 33 are configured and operated in the same way, to releasably retain the cross-piece in FIG. 4 position.

Finally, counterbalance means is operatively connected with the first and second leg means to yieldably resist downward movement of the platform under the weight exerted by the heavy machine. As shown, the counterbalance means includes a tension spring or springs 40. The left ends 40a of the springs are connected to brackets 41 attached to cross-piece 24b; and the right ends 40b of the springs are connected to brackets 42 attached to cross-piece 28b. The spring tension is set to enable lifting and lowering of the platform and heavy machine, in response to very little upward or downward force exertion on the platform. Note stops 50 positioned on legs 28a to engage legs 24a (see FIG. 4) and transmit loading from legs 24a to legs 28a in down position of the apparatus.

FIG. 8 shows the provision of an auxiliary lock to prevent sudden upward extension of the platform, in response to counterbalance spring contraction, as for example could occur if the machine 11 were lifted from the platform. As shown, the lock comprises a member 54 projecting sidewardly, into a hole 55 in guide plate 30. Member 54 is carried by a cam 33, and is shown as having threaded connection to the cam so as to be advanced into or retracted from the hole 55, as desired. Thus, the cam 33 holds the cross-piece 28b in retained position (see FIG. 4) until member 54 is retracted from the hole 55, allowing cam 33 to be pivoted; conversely, cam 33 cannot be inadvertently unlatched when pin member 54 is in hole 35.

Finally, FIGS. 9–11 show an alternate safety catch 60, to hold the legs against inadvertent collapse. Thus, pin 61 is urged into a hole 62 in the platform 15, as by spring 63. Pin 61 is carried by element 64 mounted on leg cross-piece 28a. A pull knob 65 releases the pin from the hole.

FIG. 12 shows the counterbalance in alternate form of a torsion spring 70 having arms 71 and 72 respectively connected to the legs 24a and 28a at 71a and 72a. The spring may extend between the legs of each pair and be connected to leg 24a of one pair and leg 28a of the other pair.

FIG. 13 shows a removable connection 80 for axle 29, as including coupler sleeves 81 on the lower ends of legs 28a, to receive the axle, and pins 82 in sleeves 81 to lock the axle in position.

FIG. 14 shows a rotatable screw 84 having connection to guide plate 30 at 85 and 86, and threaded connection to cross-piece 28b at 87. When crank 88 is hand turned, the screw rotates and displaces cross-piece 28b leftwardly or rightwardly.

FIGS. 15 and 16 show a modified carrier apparatus, wherein components which are the same as in FIGS. 1–4 bear the same identifying numerals.

In this modification, laterally spaced guides are associated with the platform 15 and the second leg means upper extent (for example 28b) to limit relative motion therebetween, laterally, during travel of the cross-piece 28b between the first and second positions relative to stops 30b (see also FIGS. 1 and 4). Such guides may advantageously comprise arms 110 and 111 projecting upwardly at the lateral sides of the guide plate 30; and the arms typically are integral with the turned corners 28c of the leg means 28, projecting upwardly past the lateral sides of plate or plates 30 and into close laterally spaced relation with the laterally spaced and longitudinally parallel opposite sides 112 and 113 of platform 15. Note welding 114 and 115 attaching the arms to turned corners 28c.

More specifically, releasable lock means is provided to include arm 110, and a plunger carried by that arm to releasably attach to structure associated with the upper platform 15 and to block movement of the platform relative to the second leg means until the platform and heavy machine 11 are to be lowered. The illustrated releasable lock means also includes a tubular part 117 attached to the arm 110 to project laterally therefrom, away from the platform. Plunger 118 is carried by that part 117 to be movable laterally toward and away from the platform side 112. See for example annular flange 118a on plunger stem 118b, which guides in the bore 119 of tubular part 117. Flange 118a also engages the side 110a of arm 110 to limit plunger travel toward the platform, at which time the plunger end 118c is receivable within a recess 120 formed in the platform side, in FIG. 15 position, and as indicated at 118c' in FIG. 17. A third function of the flange 118a is to support one end of compression spring 121 tending to resiliently urge the plunger toward the platform. The spring is held in position by a sleeve 123 threadably attached at 124 to the bore of part 117. The end 118d of the plunger is threadably attached at 125 to a pull-knob 126a, which may be pulled outwardly to release the plunger from recess 120, and thereby release the leg 28 from the platform, allowing lowering of the platform to FIG. 4 position, by use of handle 150.

To prevent inadvertent sudden release of the platform and its sudden dropping to FIG. 4 position (as when work is carried by machine 11 to apply weight overcoming the counterbalance spring 40), a safety set screw 126 is adjustably (threadably) attached at 127 to the second arm 111. That screw is tightened to engage the opposite side 113 of the platform, in FIG. 15 (up) position. Therefore, if plunger 118 is pulled free of the platform, the latter will not drop until the user also releases the set screw 126. He is thus forewarned that he should manually assist lowering of the platform to prevent its sudden dropping, as when added weight is on the carried machine.

The set screw may be loosened just enough to apply brake pressure to the side of the platform, braking its lowering, the end of plunger 118 also engaging the opposite side of the platform (due to pressure of spring 121) to assist in guiding the platform during its lowering and leg travel relative to the platform.

I claim:

1. A collapsible carrier for a heavy machine comprising:
   (a) an upper platform adapted to support the machine,
   (b) first leg means pivotally attached to the platform and extending downwardly and forwardly relative to the platform,
   (c) second leg means having upper extent located to support the platform and extending downwardly and rearwardly relative to the platform,
   (d) the first and second leg means pivotally interconnected below the level of said platform,
   (e) there being a slide surface integral with the platform and presented to transmit loading to said second leg means upper extent as said upper extent travels therealong between first and second positions corresponding to raised and lowered positions of the platform, and there being stops associated with the platform to limit said travel at said first and second positions,
   (f) releasable means to lock said second leg means upper extent to the platform,
   (g) and counterbalance means operatively connected with said first and second leg means to yieldably resist downward movement of the platform, thereby counterbalancing the weight of said machine,
   (h) said releasable lock means including at least one arm integral with the second leg means upper extent and projecting upwardly adjacent at least one of said stops in said first position of the second leg means upper extent, and at least one plunger carried by said arm to releasably attach to structure integral with the upper platform and block movement of the platform relative to said second leg means,
   (i) and including a second arm integrally carried by the second leg means upper extent, said one arm and said second arm projecting in guiding relation with the platform in all positions of said travel of the second leg means upper extent between said stops, whereby the second leg means upper extent and said platform have mutually guided relation during said travel,
   (j) said arms projecting upwardly at opposite sides of the platform to form with said second leg means upper extent a channel in which the platform is received and travels relative to the second leg means upper extent,
   (k) and an adjustable set screw carried by the second arm to engage a side of the platform.

2. The carrier of claim 1 wherein said slide surface is defined by a guide plate the opposite ends of which extend downwardly and reversely to form said stops, below the level of the platform, said arm projecting upwardly proximate one of the guide plate reversely turned ends in said first position of the second leg means.

3. The carrier of claim 2 wherein the guide plate is downwardly open between said ends which are U-shaped.

4. The carrier of claim 1 wherein the first leg means has upper end extent pivotally attached to the platform, and also to which the counterbalance means is attached, below the level of the platform.

5. The carrier of claim 1 wherein said counterbalance means includes a tension spring having an end operatively connected to said second leg means upper extent, at a location below the level of said platform.

6. The carrier of claim 1 including a pipe threading machine supported on the platform.

7. The carrier of claim 1 including an axle supporting and removably connected to lower extent of the second leg means.

8. The carrier of claim 1 wherein said releasable lock means also includes a tubular part carried by said arm, the plunger supported for movement within the tubular part for lateral travel toward and away from the platform, and means by which the plunger may be retained in interlocking relation with the platform.

9. The carrier of claim 8 wherein said plunger retainer means includes a recess in the side of the platform, and a connection between the plunger and tubular part to releasably hold the plunger in a locking position in which the end of the plunger is received in said recess.

10. The carrier of claim 9 wherein said connection comprises interengaged threads on the plunger and on the tubular part and including a spring urging the plunger toward said locking position.

* * * * *